United States Patent [19]

Rahmlow, Jr.

[11] Patent Number: 5,488,511
[45] Date of Patent: * Jan. 30, 1996

[54] SPATIALLY TUNABLE RUGATE NARROW REFLECTION BAND FILTER

[75] Inventor: Thomas D. Rahmlow, Jr., Bethlehem, Conn.

[73] Assignee: Hughes Aircraft Company, Los Angeles, Calif.

[ * ] Notice: The portion of the term of this patent subsequent to Jul. 11, 2012, has been disclaimed.

[21] Appl. No.: 862,858

[22] Filed: Apr. 3, 1992

[51] Int. Cl.$^6$ ................. G02B 1/10; G02B 5/28
[52] U.S. Cl. ............................. 359/586; 359/589
[58] Field of Search .................... 359/586, 589, 359/588

[56] References Cited

U.S. PATENT DOCUMENTS

| | | | |
|---|---|---|---|
| 2,708,389 | 5/1955 | Kavanagh | 88/112 |
| 3,442,572 | 5/1969 | Illsley et al. | 350/166 |
| 4,187,475 | 2/1980 | Wieder | 331/94.5 |
| 4,346,992 | 8/1982 | Schwartz | 356/73 |
| 4,583,822 | 4/1986 | Southwell | 350/164 |
| 4,952,025 | 8/1990 | Gunning, III | 350/164 |
| 4,957,371 | 9/1990 | Pellicori et al. | 356/419 |
| 5,004,308 | 4/1991 | Hall et al. | 350/1.7 |
| 5,111,467 | 5/1992 | Bradley | 372/32 |
| 5,181,113 | 1/1993 | Southwell | 359/586 |

FOREIGN PATENT DOCUMENTS 1208525A  1/1986  U.S.S.R. .

OTHER PUBLICATIONS

"Spectral Response Calculations of Rugate Filters Using Coupled-Wave Theory", 1988 Optical Society of America, vol. 5(9), 1558–1564 (Sep. 1988) pp. 560–566; W. H. Southwell.

Primary Examiner—Mark Hellner
Attorney, Agent, or Firm—W. C. Schubert; W. K. Denson-Low

[57] ABSTRACT

An optical filter (10) has a radiation receiving surface, the filter including a rugate reflection filter having a reflection wavelength characteristic varies along an axis of the radiation receiving surface. The optical filter includes a plurality of serially disposed rugate coatings (10b, 10c) and has a wavelength rejection gradient that exhibits a linear, logarithmic, or power function of wavelength rejection as a function of position on the radiation receiving surface. Two or more rugate subfilms may overlap one another, or none of the rugate subfilms may overlap. The filter has a first optical density associated with a first one of the subfilms, a second optical density associated with a second one of the subfilms, and, for overlapping spectral ranges, a third optical density within a region wherein at least two subfilms overlap one another. The third optical density is a summation of the first optical density and the second optical density.

19 Claims, 4 Drawing Sheets

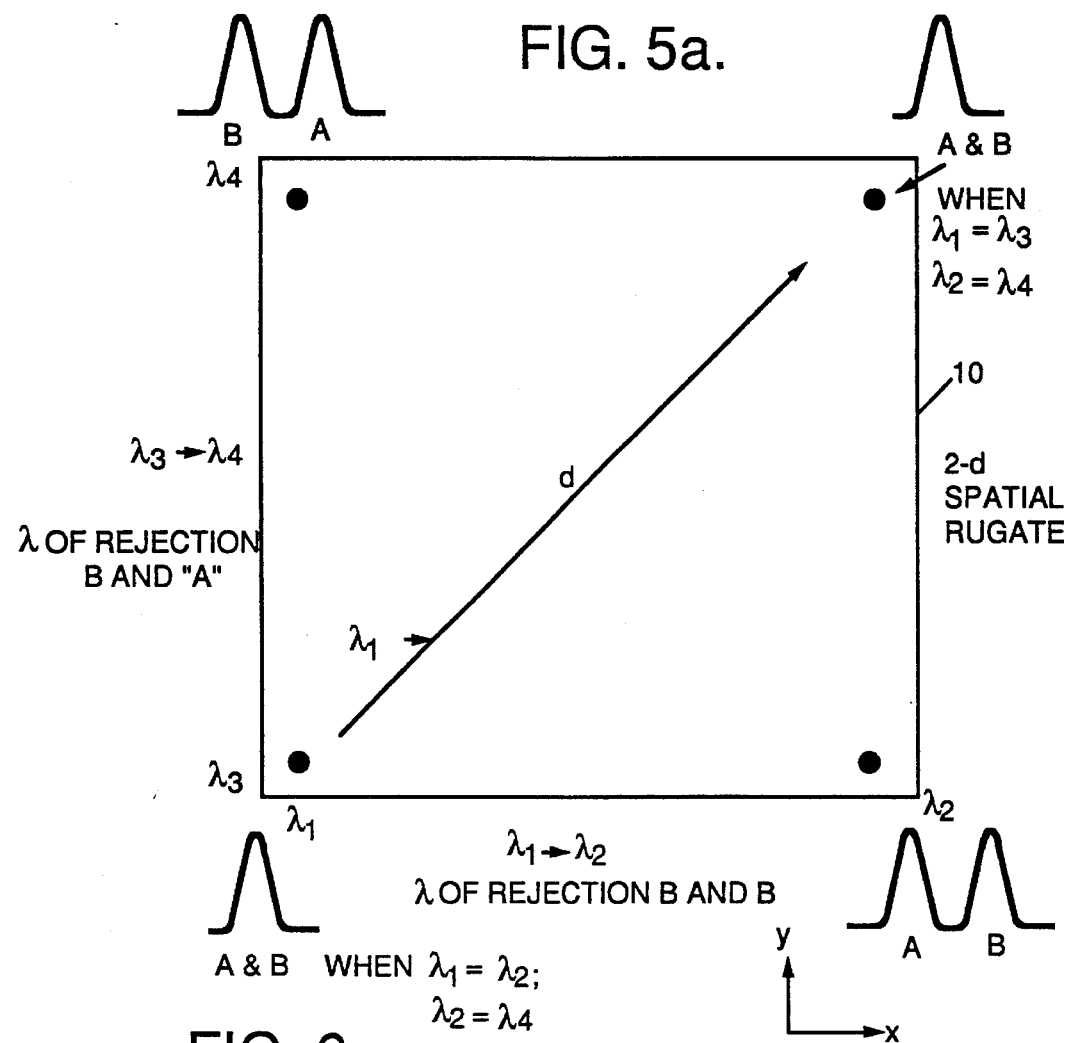
FIG. 5a.
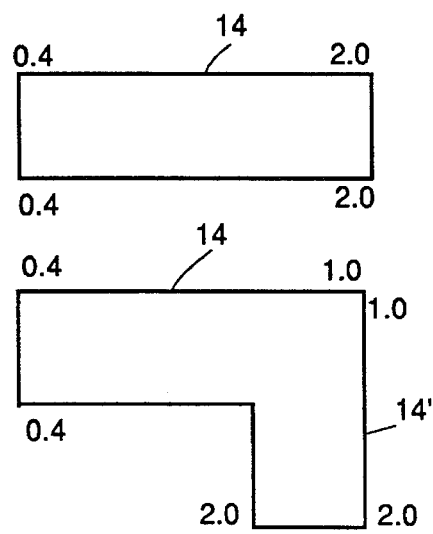
FIG. 6a.
FIG. 6b.
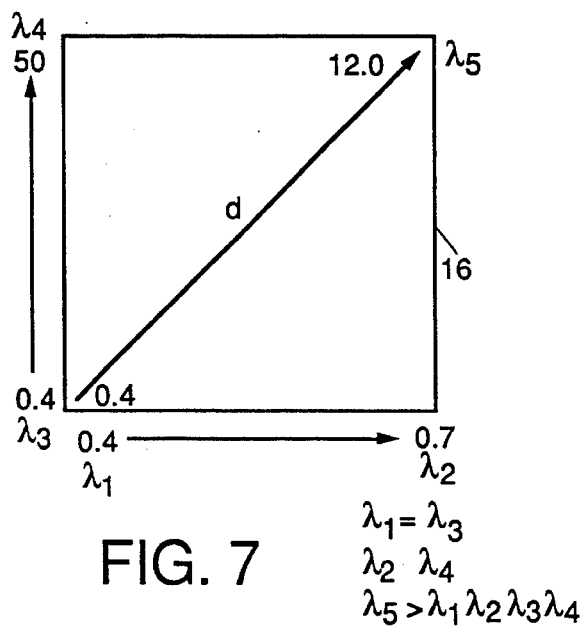
FIG. 7

SPATIALLY TUNABLE RUGATE NARROW REFLECTION BAND FILTER

CROSS-REFERENCE TO A RELATED PATENT APPLICATION

This patent application is related to commonly assigned U.S. patent application Ser. No. 07/867,858, now U.S. Pat. No. 5,432,638, filed on even date herewith, and entitled "Spatially Tunable Rugate Narrow Reflection Band Filter And Applications Therefor" by T. D. Rahmlow, Jr. (Attorney's Docket No. PD-D91053).

FIELD OF THE INVENTION

This invention relates generally to optical filters and, in particular, to optical reflection filters.

BACKGROUND OF THE INVENTION

It is advantageous for many applications to provide a tunable optical filter to reflect a specific wavelength while maintaining a high spectral throughput for other wavelengths. A discrete reflection filter design may be made spatially tunable. However, a discrete reflection filter having a desired narrow reflection wavelength band, and also a high spectral throughput, may be difficult to achieve.

For example, a comb filter design exhibits only a notched spectral throughput characteristic, although the comb filter may be rotatably tunable.

Filter wheels also exhibit poor spectral throughput and also have, in general, broad spectral notches. An example of a circularly variable wide bandpass interference filter is described in U.S. Pat. No. 3,442,572, issued May 6, 1969 to R. F. Illsley et al. This filter employs a plurality of quarter wavelength thick layers of low and high index of refraction coatings.

Wedged filters are also known in the art. In U.S. Pat. No. 4,346,992, issued Aug. 31, 1982 to J. Schwartz there is described a laser detector and spectral analyzer that includes a wedge interference filter having a systematic positional variation in a thickness of deposited interference layers. This results in a systematic variation in the center of the local passband with position along a left-right axis of the filter. In U.S. Pat. No. 2,708,389, issued May 17, 1955 to F. W. Kavanagh there is described a wedged interference filter having supplementary wide passband filters. In U.S. Pat. No. 4,187,475, issued Feb. 5, 1980, to I. Wieder there is described a wedged transmission filter as an output mirror for a pulsed dye laser. In SU 1208-525-A there is described a narrow band interference filter that employs alternating layers of titanium dioxide and silicon dioxide deposited by electron beam (E-beam) evaporation.

One type of reflection filter that does exhibit a narrow wavelength reflection band, and that does not require alternating sequences of discrete quarter wavelength high and low index interference films, is known as a rugate.

In this regard reference is made to an article entitled "Spectral Response Calculations of Rugate Filters Using Coupled-wave Theory", by W. H. Southwell, Journal of the Optical Society of America, Vol. 5(9), 1558–1564 (1988). This article discusses gradient-index interference filter coatings having an index of refraction that varies in a continuous fashion in a direction normal to a substrate. A narrow bandwidth reflector is shown to be achieved with a rugate coating, the bandwidth being inversely proportional to rugate thickness.

In FIG. 1 there is shown an exemplary rugate index of refraction (n) profile as a function of mechanical thickness of the rugate coating. In FIG. 1, the filter substrate is on the right, light is incident from the left, $n_o$ is the average index of refraction through the rugate, and $n_1$ is the peak index of refraction variation, which is typically small compared with $n_o$.

The word rugate, when used as a noun, is herein intended to define a gradient-index interference filter whose index of refraction profile is periodic as a function of film thickness. A typical example is a sine wave. When used as an adjective, the word rugate is herein taken to describe the periodic gradient index of refraction profile of a coating.

For a single wavelength a rugate has an index of refraction (index) profile of:

$$n = n_o + n_1 \sin(Kx + \phi), \quad K = 2(n_o)k, \quad k = 2\pi/\lambda.$$

where $n_o$ is an average index, $n_1$ is a peak index variation, K determines a wavelength $\lambda$ for which maximum reflection occurs, $\phi$ is a starting phase of the index variation, and x is a thickness within a range of ($0 \leq x \leq L$). The reflectivity (r) produced by this profile is approximated by:

$$r = \tanh(u/4)\exp(i\phi)$$

$$u = KLn_1/n_o = 2\pi N n_1/n_o,$$

where $\Delta\lambda/\lambda = n_1/n_o$ is a fractional bandwidth, where N is a number of cycles in the coating, normally half integer, and L is the physical thickness of the coating. It can be seen that the maximum reflectivity at $\lambda$ is determined by the product of the fractional index variation times the number of cycles.

For multiple wavelengths which are separated on the order of $\Delta\lambda$, a rugate may be obtained for each wavelength by summing index profiles:

$$n = n_o + \Sigma n_i \sin(K_i x + \phi_i),$$

as is shown in FIG. 2 for rugates A, B, and C, the summation of which provides the index variation, as a function of coating mechanical thickness, shown as D. For this technique multiple reflection bands are generated by depositing a single coating layer having an index of refraction profile which is predetermined to be the sum of the periods of the desired spectral lines. This technique is known as parallel deposition. A narrow multiple reflection notch rugate filter may also be obtained by serially depositing a plurality of coatings, each having a different index of refraction profile. That is, one coating is deposited upon another. A combination of serial and parallel rugate coating deposition techniques may also be employed.

FIG. 3 graphically illustrates a transmission plot of a typical narrow notch multiple line rugate filter, and FIG. 4 graphically illustrates a corresponding optical density plot for the multiple line rugate filter of FIG. 3. Optical density (D) is defined to be the base 10 logarithm of the reciprocal of transmittance (T):

$$D = \log_{10}(1/T), \text{ or } T = 10^{-D}.$$

As a result of these properties, a rugate filter design may greatly extend a filter's applications, in that a rugate filter has properties of narrow, high optical density and single or multiple reflection bands which lack significant harmonic structure. The rugate property of not exhibiting significant harmonics eliminates the interaction of serially disposed subfilms, or coatings, on spectral performance. In contradistinction, harmonic reflection bands in a discrete filter subfilm, that is designed to cover a long wavelength region, may adversely impact performance at a short wavelength region.

It is thus one object of the invention to provide a rugate narrow reflection band filter wherein a wavelength of the narrow reflection band is spatially varied over the filter.

SUMMARY OF THE INVENTION

The foregoing and other problems are overcome and the objects of the invention are realized by a rugate narrow reflection band filter having an optical interference coating that exhibits a property that the wavelength of the narrow reflection band varies continuously along an axis of the filter. Multiple optical coatings are deposited serially along different axes to provide for independent selection of single or multiple reflection band wavelengths at different spatial locations on the filter. The result is a single reflection band or a multiple reflection band filter in which the wavelength of the reflections are individually tunable by shearing, or translating, the filter along the optical coating axes.

More specifically, an optical filter has a radiation receiving surface and includes a rugate reflection filter having a reflection wavelength characteristic that varies along an axis of the radiation receiving surface. The optical filter includes a plurality of serially disposed rugate coatings and has a wavelength rejection gradient that exhibits a linear, logarithmic, or power function of wavelength rejection as a function of position on the radiation receiving surface. Two or more rugate subfilms may overlap one another, or none of the rugate subfilms may overlap. The filter has a first optical density associated with the first of the subfilms, a second optical density associated with a second one of the subfilms, and, for overlapping subfilms, a third optical density within a region wherein at least two of the subfilms' spectral regions overlap on another. If the phase of the rugate index profile is continuous from subfilm to subfilm, as in this case, the third optical density is a summation of the first optical density and the second optical density. If the phase is discontinuous across the subfilms, such as is caused by the addition of a cavity of constant index, the third optical density region is that of a narrow bandpass filter, rather than that of a band rejection filter (Fabry Perot).

The spatially tunable rugate filter allows for a continuous variation in reflection notch position across a spectral range. The resulting filter may be placed at or near a focal point in an optical system to attenuate, by reflection, specific wavelengths of light from the entire field of view. The filter may also be placed at or near a focal plane for attenuating, by reflection, particular wavelengths at specific field locations. The filter may be employed to reflect a spectrum of light and to thus replace conventional spectrally dispersive elements, such as diffraction gratings and prisms.

Varying the optical coating deposition along different axes provides for independently tuning the wavelengths of multiple reflection bands. The reflection bands of serially applied coatings may have a common, or overlapping, spectral range, or the serially applied coatings may have non-intersecting spectral ranges.

One advantage of providing overlapping spectral ranges is that the filter has a region, such as a diagonally disposed stripe, wherein the optical density of the filter is the sum of the optical densities of the serially disposed rugate subfilms. This provides prescribed levels of optical density, with the number of levels being equal to the number of spatially variable subfilms. Multiple, partially overlapping subfilms may have different spectral ranges and thus afford different wavelength resolution along different axes within the same filter.

One advantage of providing non-overlapping spectral regions is to extend the response range of the filter without extending the linear dimension of the filter. That is, the filter is effectively folded in n dimensions, where n is equal to the number of serial subfilms. The selection of non-overlapping spectral regions further enables an independent selection of reflection bands for different spectral regions. This is especially useful when the filter is used with a plurality of optical sensors which perform different functions, but which use common optics.

The wavelength gradient of the filter is preferably controlled during the rugate coating deposition process. Linear, logarithmic, or power functions of wavelength (or wavenumber) versus spatial position are thereby obtained, providing for the tuning of wavelength resolution and reflected light intensity. This property may beneficially aid detector response, or reduce processing time in high speed spectral instruments. If the filter is used as a light dispersive element, those regions where a detector is less sensitive benefit from reduced resolution as a result of higher reflected light.

BRIEF DESCRIPTION OF THE DRAWING

The above set forth and other features of the invention are made more apparent in the ensuing Detailed Description of the Invention when read in conjunction with the attached Drawing, wherein:

FIG. 5a is a top view that illustrates a two-axis spatial rugate reflection filter wherein the wavelength of the rejection band varies from a value of $\lambda_1$ to a value of $\lambda_2$ in the x-axis direction, and from a value of $\lambda_3$ to a value of $\lambda_4$ in the y-axis direction;

FIG. 5b is an elevational view of the filter of FIG. 5a;

FIG. 6a illustrates a linear spatially varying rugate filter;

FIG. 6b illustrates the linear rugate filter of FIG. 6a being folded by the addition of variable rugate layers;

FIG. 7 illustrates a rugate filter having three subfilm rugate coatings of different spectral resolution covering the range of 0.4 microns to 12.0 microns;

DETAILED DESCRIPTION OF THE INVENTION

As employed herein the term "optical coating" is intended to encompass rugate coatings that are used with radiation within the visible spectrum of wavelengths, and also coatings that are used with radiation within other wavelength bands, such as the ultraviolet (UV) and infrared (IR) spectrums.

In accordance with the invention, the rugate property of multiple reflection bands and independent bandwidths is employed to advantage to provide spatially varying rugate reflection filters. Such filters exhibit multiple regions where reflection bands are at the same wavelength, and which further have various fields of view or bandwidths. That is, the field of view is discretely tunable. The multiple reflection bands also provide performance redundancy and insure against functional failure of the filter because of a failure at a particular location on the film.

Figure 1:
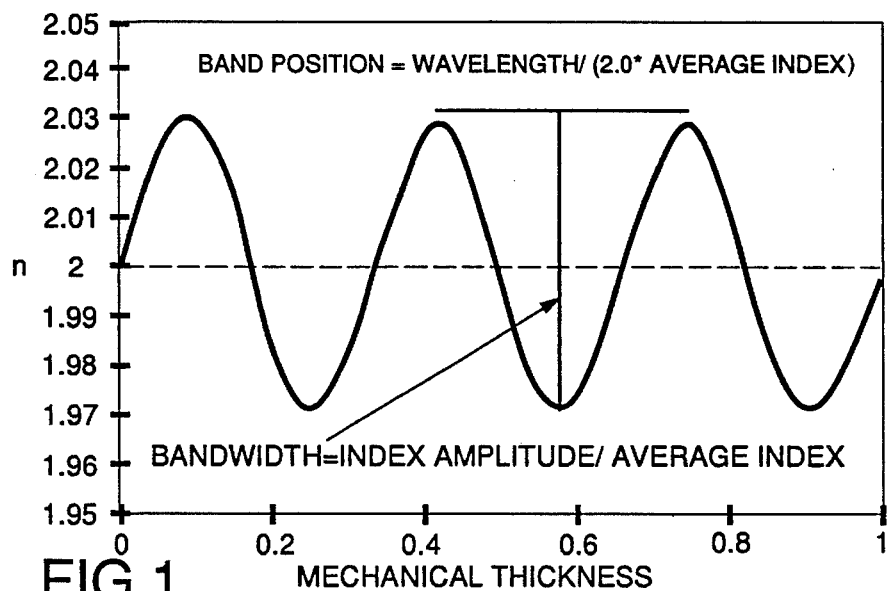
FIG. 1 is graph showing an exemplary rugate index of refraction profile as a function of mechanical thickness of the rugate coating.
Figure 3:
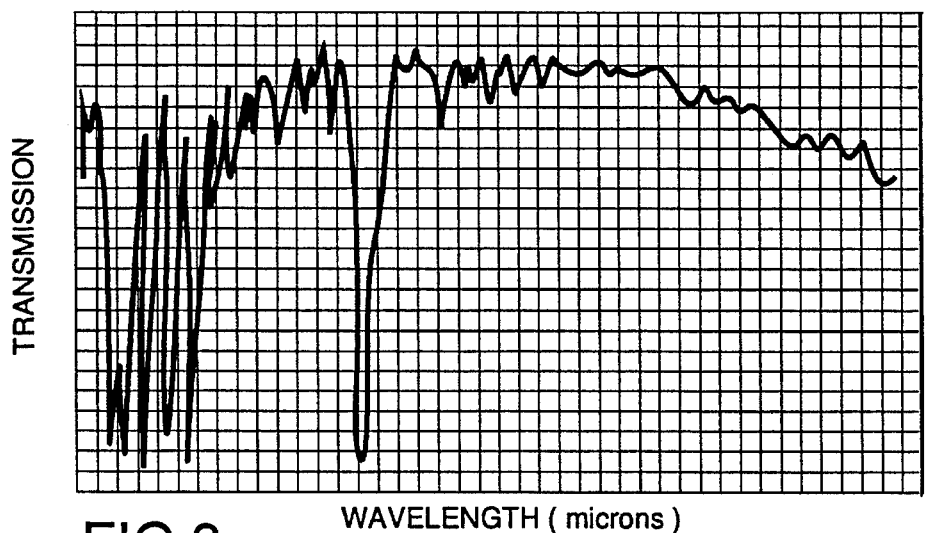
FIG. 3 graphically illustrates a transmission plot of a typical narrow notch single or multiple line rugate filter.
Figure 4:
FIG. 4 graphically illustrates an optical density plot for a single or multiple line rugate filter.
Figure 2:
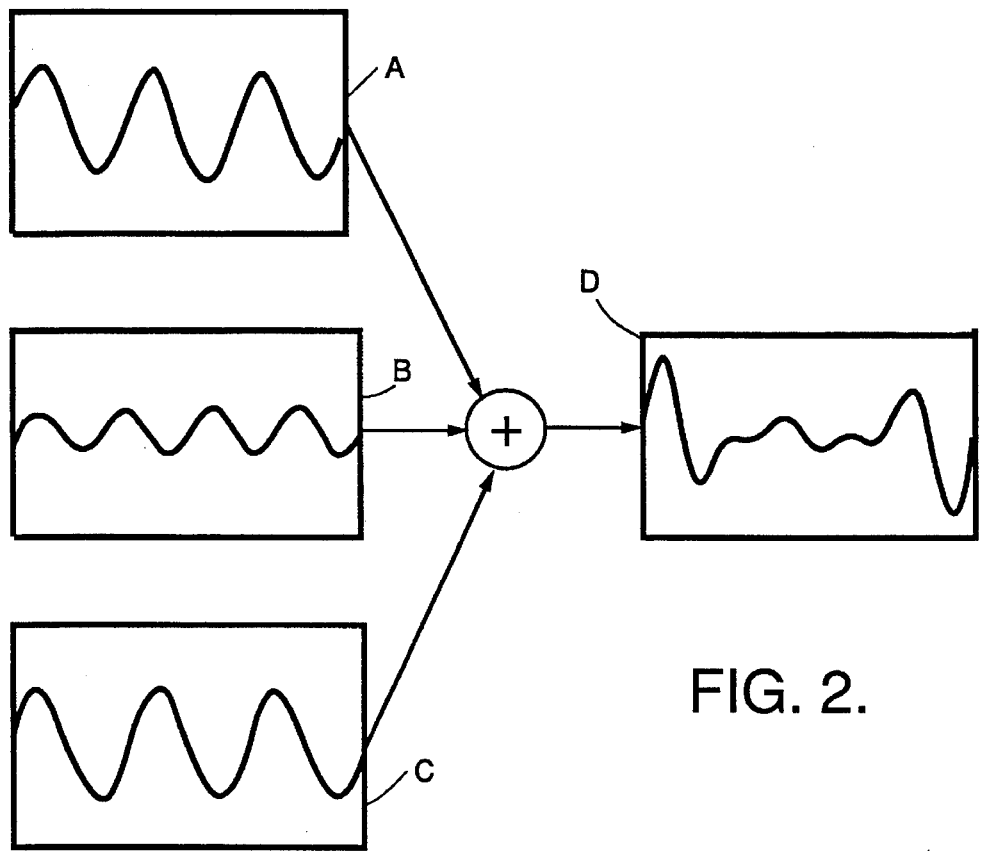
FIG. 2 illustrates in D a summation of index variations of serially disposed rugate coatings A, B, and C.
Figure 5B:
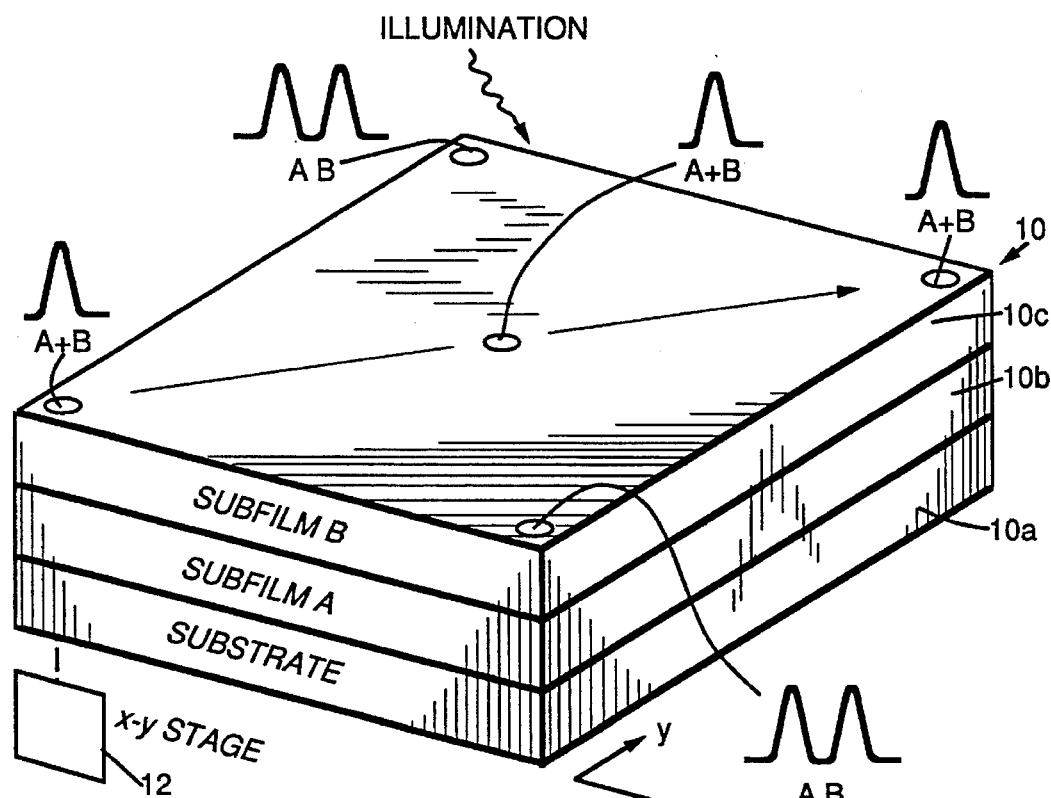

Referring to FIG. 5a, in conjunction with FIG. 5b, a spatially tunable rugate optical filter 10 provides for a reflection notch position to vary continuously along each axis of the filter. As seen in FIG. 5b the filter 10 includes overlapping rugate subfilms that are provided upon a substrate 10a. The substrate 10a is disposed beneath a rugate subfilm A. A rugate subfilm B is disposed over the subfilm A. Along the x-axis the subfilm A exhibits a variable optical thickness per rugate cycle. Along the x-axis the subfilm B exhibits a constant optical thickness per rugate cycle. Along the y-axis this relationship is reversed and the subfilm A exhibits a constant optical thickness per rugate cycle while the subfilm B exhibits a variable optical thickness per rugate cycle.

To achieve this effect, the filter 10 is rotated during coating deposition and similar coatings are deposited along each axis. This is repeated a number of times along different axes so as to independently vary the optical performance of the filter 10 along each axis.

More specifically, FIGS. 5a and 5b illustrate, in accordance with the invention, a two-axis spatial rugate reflection filter 10 wherein the wavelength of the rejection band varies from a value of $\lambda_1$ to a value of $\lambda_2$ in the x-axis direction and from a value of $\lambda_3$ to a value of $\lambda_4$ in the y-axis direction. The two axes are disposed orthogonally one to another. The two rejection bands may be individually tuned by positioning the filter with an x-y stage 12, also referred to herein as "shearing" the filter. That is, the wavelength of the first rejection band (A) is controlled by shearing the filter 10 along the y-axis, and the wavelength of the second rejection band (B) is controlled independently by shearing the filter 10 along the x-axis.

As seen in FIG. 5b, the filter 10 is comprised of two serially disposed rugate sublayers, or subfilms 10b and 10c, wherein the spectral ranges of $\lambda_1$ to $\lambda_2$ and $\lambda_3$ to $\lambda_4$ are set equal to one another. This provides a summing of the optical density along the diagonal (d) of the filter 10. For the illustrated embodiment, the optical density is 1.5 along each axis and, thus, 3.0 along the filter 10 diagonal. The provision of a plurality of serially arranged rugate subfilms provides for a plurality of levels of optical density. The filter 10, having two rugate subfilms, therefore exhibits two levels of optical density variability.

Figure 8A:
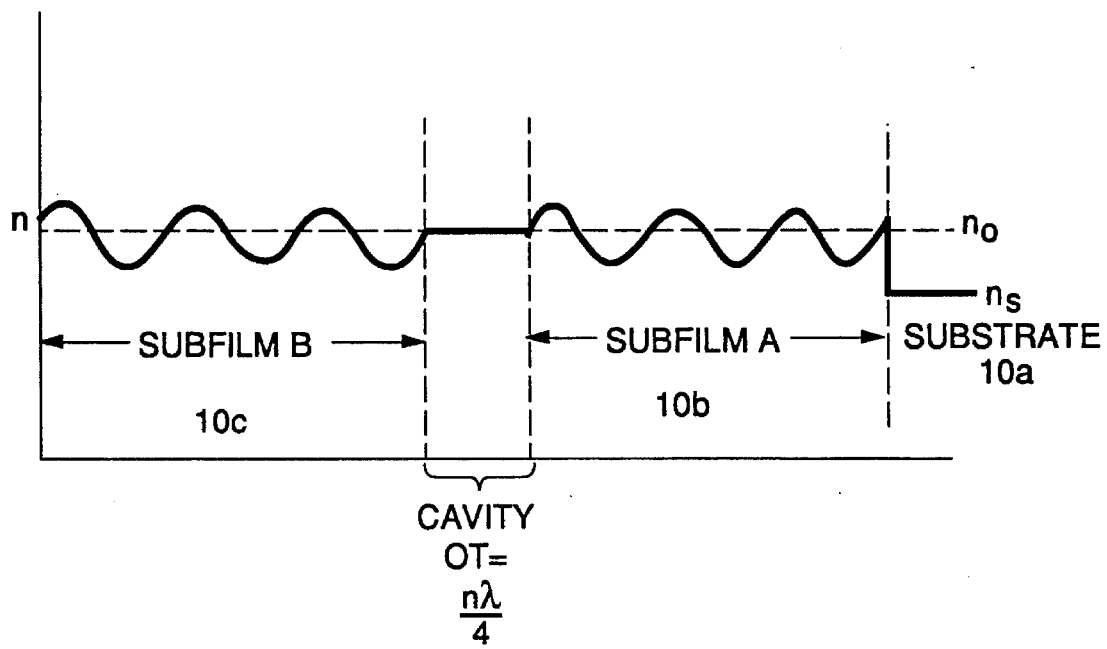
FIG. 8a is a graph that illustrates an index of refraction profile for a two subfilm, Fabry Perot, rugate filter.
Figure 8B:
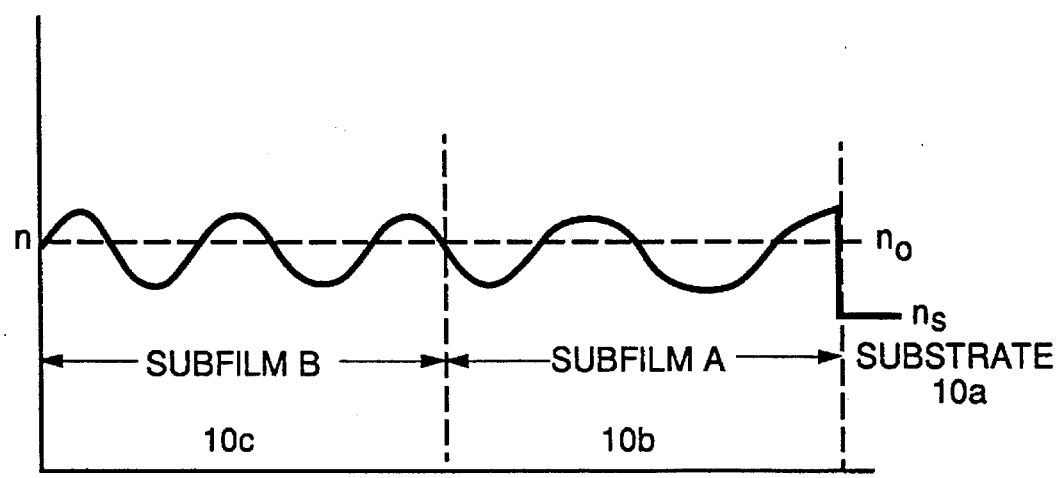
FIG. 8b is a graph that illustrates an index of refraction profile for a two subfilm all reflective rugate filter.

FIG. 8b shows the index of refraction profile for the two subfilms A and B of FIG. 5b. As can be seen, the rugate period of the subfilm B is shorter than the rugate period for subfilm A.

FIG. 8a is a graph that illustrates an index of refraction profile for a two subfilm, Fabry Perot, rugate filter embodiment of the filter 10. As can be seen, an optical cavity has an optical thickness (OT) equal to n times lambda divided by four. The optical cavity is interposed between subfilms A and B. The diagonal of such a two subfilm filter provides a bandpass function for radiation of wavelength lambda. The film orientation is changed during deposition of the constant index of refraction optical cavity, and the entire filter is fabricated during one continuous coating run.

The spatially variable rugate filters of the invention may be fabricated as a single spectral line reflection filter or as a multiple spectral line reflection filter. In general, the spatially variable rugate filters of the invention are fabricated by depositing a rugate using sources of coating material which yield spatially non-uniform material deposition. The non-uniformity of coating material deposition may be accomplished using masks to give a prescribed variation in wavelength performance across the radiation receiving surface of the filter. The variation may be designed to be linear with wavelength or wavenumber, or to vary logarithmically with wavelength or wavenumber, or to vary as a power series of wavelength or wavenumber.

Further in accordance with the invention a linear rugate filter is "folded" by the addition of variable rugate subfilms. In this regard, FIG. 6a illustrates a linear rugate filter 14 and FIG. 6b illustrates the linear rugate filter 14 of FIG. 6a being folded into a right-angle filter 14' by the addition of rugate layers. As can be seen, the linear rugate filter 14 of FIG. 6a covers the spectral range of 0.4 to 2.0 microns. The filter 14' of FIG. 6b also covers the saute spectral range, but is folded at the 1.0 micron position.

FIG. 7 illustrates a rugate filter 16 having three rugate subfilm coatings of different spectral resolution covering the range of 0.4 microns to 12.0 microns. That is, filter 16 covers the spectral range from near UV to long wave infrared (LWIR). Along the y-axis the rejection wavelength band is continuous from 0.4 microns to 5.0 microns, along the x-axis the rejection wavelength band is continuous from 0.4 microns to 0.7 microns, and along the diagonal (d) the rejection wavelength band is continuous from 0.4 microns to 12.0 microns.

One advantage of providing overlapping spectral ranges is that the filter has a region, such as a diagonally disposed stripe, wherein the optical density of the filter is the sum of the optical densities of the serially disposed rugate subfilms. This provides prescribed levels of optical density, with the number of levels being equal to the number of spatially variable subfilms. Multiple, partially overlapping subfilms may have different spectral ranges and thus afford different wavelength resolution along different axes within the same filter.

One advantage of providing non-overlapping spectral regions is to extend the response range of the filter without extending the linear dimension of the filter. That is, the filter is effectively folded in n dimensions, where n is equal to the number of serial subfilms. The selection of non-overlapping spectral regions further enables an independent selection of reflection bands for different spectral regions. This is especially useful when the filter is used with a plurality of optical sensors which perform different functions, but which use common optics.

For visible wavelengths, exemplary filter substrate materials are BK-7 and fused silica, and one exemplary rugate coating material combination is titanium oxide and silicon dioxide. For IR wavelengths, exemplary filter substrate materials are sapphire, zinc selenide, and germanium, and one exemplary rugate coating material combination is thorium fluoride and zinc selenide.

The rugate coatings may be applied by a number of known types of coating deposition methods including, but not limited to, thermal evaporation, E-beam evaporation, and sputtering.

In particular, single subfilm and dual subfilm devices have been fabricated. These filters were made by codepositing $T_iO_2$ and $S_iO_2$. The $S_iO_2$ was held at a constant rate while the $T_iO_2$ rate was varied to give the required index variation of the deposited blended film. The substrate was oriented at an angle to the sources so as to induce a strong non-linearity in the deposited film. After a single sublayer film was deposited, the substrate was rotated 90° and deposition continued. In the case of an OD additive filter, the filter was rotated without interrupting the index modulation. In the case of the two subfilm bandpass filter, a cavity of constant index of one quarter wave thickness was deposited before resuming the rugate index profile following substrate rotation. The phase of the second rugate profile was offset by 180° with respect to the phase of the first subfilm rugate.

While the invention has been particularly shown and described with respect to preferred embodiments thereof, it will be understood by those skilled in the art that changes in form and details may be made therein without departing from the scope and spirit of the invention.

What is claimed is:

1. An optical filter having a radiation receiving surface, said filter comprising a rugate reflection filter having a reflection wavelength that varies along an axis of the radiation receiving surface.

2. An optical filter as set forth in claim 1 wherein the filter includes a plurality of serially disposed rugate coatings, including a first coating having a first reflection wavelength which varies along a first axis of the radiation surface, and a second coating having a second reflection wavelength which varies along a second axis of the radiation surface, said second axis being different from said first axis.

3. An optical filter as set forth in claim 1 wherein the reflection wavelength varies along the axis in accordance with a linear function, a logarithmic function, or a power function.

4. An optical filter as set forth in claim 1 including a plurality of rugate subfilms, and wherein at least two of said subfilms overlap one another.

5. An optical filter as set forth in claim 1 including a plurality of rugate subfilms, and wherein none of said subfilms overlap one another.

6. An optical filter as set forth in claim 4 wherein said filter has a first optical density associated with a first one of said at least two subfilms, a second optical density associated with a second one of said at least two subfilms, and a third optical density within a region wherein said at least two subfilms overlap one another.

7. An optical filter as set forth in claim 6 wherein the third optical density is a summation of the first optical density and the second optical density.

8. An optical filter as set forth in claim 2 and further including an optical cavity that is interposed between two of said plurality of serially disposed rugate coatings.

9. An optical filter having a radiation receiving surface at least partially bounded by a first edge and by a second edge, the first edge and the second edge meeting at a first corner, said filter comprising a rugate reflection filter having a reflection wavelength characteristic that varies continuously from the first corner and along the first edge from a first reflection wavelength of $\lambda_1$ to a second reflection wavelength of $\lambda_2$, said filter further having a reflection wavelength characteristic that varies continuously from the first corner and along the second edge from a third reflection wavelength of $\lambda_3$ to a fourth reflection wavelength of $\lambda_4$.

10. An optical filter as set forth in claim 9 wherein $\lambda_1$ is equal to $\lambda_3$, and wherein $\lambda_2$ is equal to $\lambda_4$.

11. An optical filter as set forth in claim 9 wherein $\lambda_1$ is equal to $\lambda_3$, and wherein $\lambda_2$ is not equal to $\lambda_4$.

12. An optical filter as set forth in claim 11 wherein the optical filter has a reflection wavelength of $\lambda_5$ at a second corner diagonally opposite the first corner, and wherein $\lambda_5$ is greater than $\lambda_1$, $\lambda_2$, $\lambda_3$, and $\lambda_4$.

13. An optical filter as set forth in claim 9 wherein the filter includes a plurality of serially disposed rugate coatings.

14. An optical filter as set forth in claim 9 wherein the reflection wavelength varies, along the first edge and along the second edge, in accordance with a linear function, a logarithmic function, or a power function.

15. An optical filter as set forth in claim 9 including a plurality of rugate subfilms, and wherein at least two of said subfilms overlap one another.

16. An optical filter as set forth in claim 9 including a plurality of rugate subfilms, and wherein none of said subfilms overlap one another.

17. An optical filter as set forth in claim 15 wherein said filter has a first optical density associated with a first one of said at least two subfilms, a second optical density associated with a second one of said at least two subfilms, and a third optical density within a region wherein said at least two subfilms overlap one another, and wherein the third optical density is a summation of the first optical density and the second optical density.

18. An optical filter as set forth in claim 13 and further including an optical cavity that is interposed between two of said plurality of serially disposed rugate coatings.

19. A method of operating a rugate reflection filter having a radiation receiving surface at least partially bounded by a first edge and by a second edge, comprising the steps of:

illuminating the filter;

shearing the filter in a direction along the first edge for varying a reflection wavelength characteristic from a first reflection wavelength of $\lambda_1$ to a second reflection wavelength of $\lambda_2$; and shearing the filter in a direction along the second edge for varying a reflection wavelength characteristic from a third reflection wavelength of $\lambda_3$ to a fourth reflection wavelength of $\lambda_4$.

* * * * *